United States Patent [19]

Runge

[11] 4,030,368

[45] June 21, 1977

[54] SPRING-LOADED DIFFERENTIAL PRESSURE GAGE

[75] Inventor: Hans-Jürgen Runge, Kisdorf, Germany

[73] Assignee: Warner Lewis Jr. Industrie- Filter GmbH, Frankfurt am Main, Germany

[22] Filed: Aug. 11, 1976

[21] Appl. No.: 713,449

[52] U.S. Cl. .................................. 73/419; 73/397
[51] Int. Cl.² ........................................ G01L 13/02
[58] Field of Search ............... 73/141 AB, 397, 419

[56] References Cited

UNITED STATES PATENTS

| 628,478 | 7/1899 | Kuhne | 73/419 |
|---|---|---|---|
| 1,106,681 | 8/1914 | Sauvage | 73/397 X |
| 2,016,586 | 10/1935 | Becker | 73/397 |
| 2,843,077 | 7/1958 | Leefer | 73/419 X |
| 3,678,754 | 7/1972 | Amir et al. | 73/419 |

*Primary Examiner*—Charles A. Ruehl
*Attorney, Agent, or Firm*—Peter K. Kontler; John Kurucz

[57] ABSTRACT

A spring-loaded differential pressure gage, particularly for testing the components of means for admitting fuel to the tanks of aircraft, has an upright glass cylinder for a reciprocable glass piston with a ring-shaped index which is movable relative to a fixed scale. The heat expansion coefficient of the material of the cylinder is identical with that of the material of the piston. The higher- and lower-pressure cylinder chambers are respectively located above and below the piston, and the piston is suspended on the stronger of two helical tension springs. The upper end of the weaker tension spring is connected to a fixedly mounted plug and the lower end of the weaker spring, as well as the upper end of the stronger spring, is connected to a second plug which is slidable along an upright guide rod having a stop at the lower end thereof. When the pressure of fluid in the upper chamber rises, the weaker spring expands and the stronger spring merely pushes the piston toward the lower end of the cylinder. The stronger spring begins to expand when the second plug abuts the stop on the guide rod.

20 Claims, 3 Drawing Figures

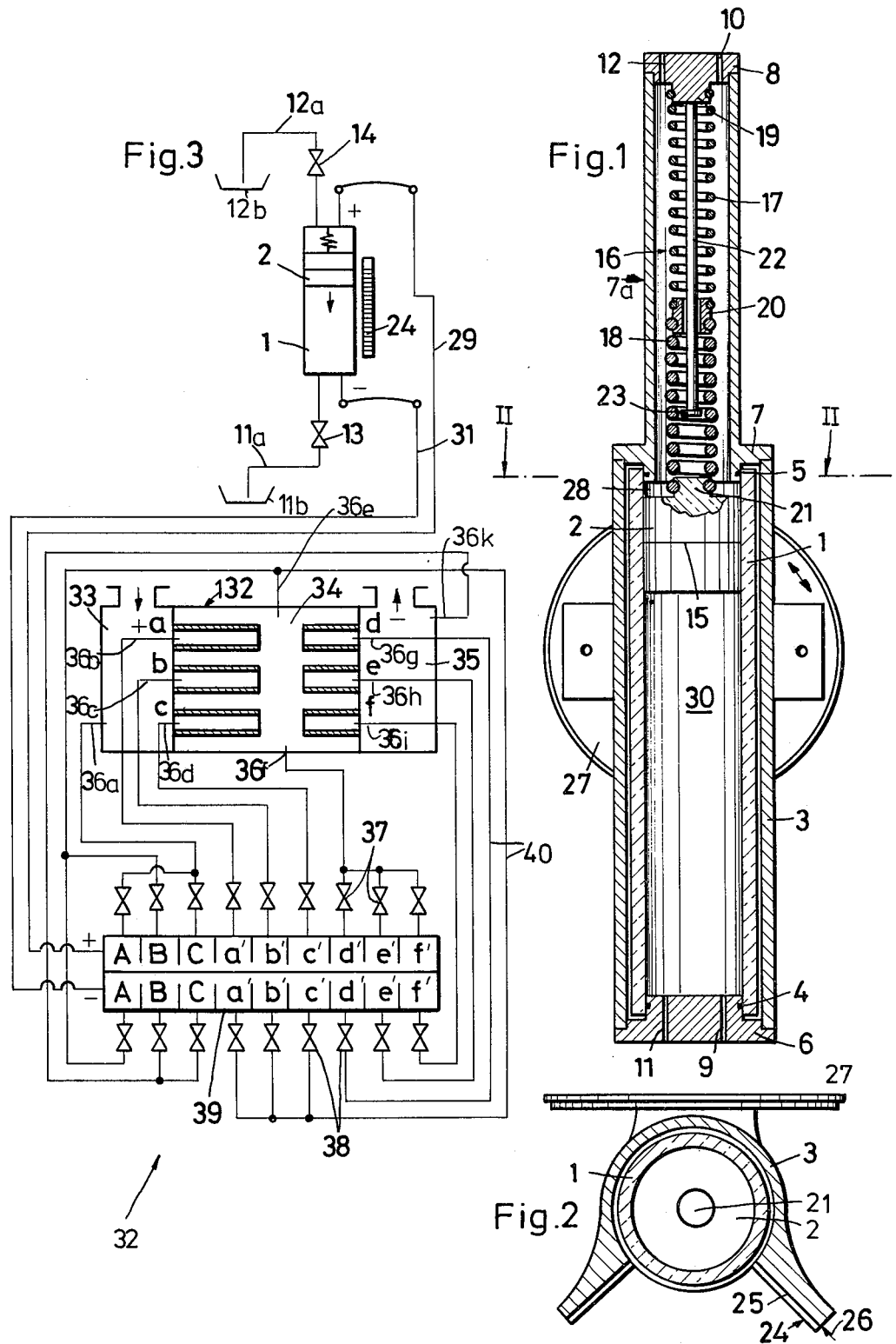

SPRING-LOADED DIFFERENTIAL PRESSURE GAGE

BACKGROUND OF THE INVENTION

The present invention relates to pressure gages in general, and more particularly to improvements in spring-loaded differential pressure gages.

It is known to employ in spring-loaded differential pressure gages a glass cylinder for steel piston which is reciprocable in and divides the interior of the cylinder into a high-pressure chamber and low-pressure chamber. The piston is biased by a compression spring in a direction to reduce the volume of the higher-pressure chamber. A drawback of such pressure gages is that the errors in readings are quite pronounced, e.g., in the range of ±0.035 atmosphere. Therefore these gages cannot be used for testing highly sensitive equipment, such as the pressure drop between the intake and discharge ends of filter elements and/or water separating elements in systems which are used for admission of fuel into the tanks of aircraft or the like. As a rule, the pressure differential between the intake and discharge ends of the aforementioned elements is less than 0.035 atmosphere. Such systems embody a host of safety features which are prescribed by authorities in order to insure that the tanks are filled with acceptable fuel.

SUMMARY OF THE INVENTION

An object of the invention is to provide a novel and improved pressure gage which is capable of furnishing readings with an accuracy greatly exceeding the accuracy of conventional pressure gages.

Another object of the invention is to provide a pressure gage, especially a spring-loaded differential pressure gage, wherein temperature changes in the surrounding atmosphere and/or changes in the temperature of fluids whose pressure requires determination cannot adversely influence the accuracy and/or reproducibility of readings.

A further object of the invention is to provide a spring-loaded differential pressure gage which is especially suited for use in testing apparatus for the filtering and/or water separating elements of equipment for admission of fuel into the tanks of aircraft which is sufficiently sensitive to detect pressure differences in the range below 0.035 atmosphere.

An additional object of the invention is to provide a novel and improved arrangement of springs for the piston of a spring-loaded pressure gage.

Still another object of the invention is to provide a novel and improved piston for a spring-loaded pressure gage.

An ancillary object of the invention is to provide novel and improved means for supporting and limiting the stressing of biasing means for the piston of a spring-loaded pressure gage.

The invention is embodied in a differential pressure gage which comprises a hollow cylinder (preferably a glass cylinder), a piston (preferably a piston made of a vitreous material whose heat expansion coefficient is the same as that of the material of the cylinder) which is reciprocably received in and divides the interior of the cylinder into a low-pressure chamber and a high-pressure chamber, and means for biasing the piston in a direction to reduce the volume of the high-pressure chamber. The biasing means comprises a plurality of tension springs (preferably helical tension springs) which are arranged in series and include a relatively weak first spring which expands only during a first stage of movement of the piston counter to the aforementioned direction and a relatively strong second spring which expands only during the next-following second stage of movement of the piston counter to the aforementioned direction.

The pressure gage preferably further comprises ports which connect the chambers with sources of differently pressurized fluids, and stop means which prevents further expansion of the first tension spring when the piston completes the first stage of its movement in a direction to increase the volume of the high-pressure chamber.

The novel features which are considered as characteristic of the invention are set forth in particular in the appended claims. The improved pressure gage itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic partly front elevational and partly central vertical sectional view of a pressure gage which embodies the invention;

FIG. 2 is a transverse horizontal sectional view as seen in the direction of arrows from the line II—II of FIG. 1; and FIG. 3 is a diagrammatic partly sectional view of an apparatus which embodies the improved pressure gage and is used to test the condition of filtering and water separating elements in a system for admission of fuel to the tanks of aircraft.

DESCRIPTION OF THE PREFERRED EMBODIMENTS

Referring to FIGS. 1 and 2, the pressure gage comprises an elongated upright glass cylinder 1 having an inside diameter which is identical with the diameter of a glass piston 2. Thus, the piston 2 is reciprocable in the cylinder 1 without any or with negligible clearance and divides the interior of the cylinder into a low-pressure lower chamber 30 and a high-pressure upper chamber 28. The heat expansion coefficeint of the vitreous material of cylinder 1 is identical with that of the material of the piston 2 so that the clearance between the internal surface of the cylinder and the periphery of the piston does not change in response to temperature changes. The periphery of the piston 2 does not have a ring or other sealing means.

The cylinder 1 is mounted in a housing or support 3 whose front side is open (see particularly FIG. 2). The lower end of the cylinder 1 receives the smaller-diameter portion of an end wall 6 which is surrounded by an O-ring 4 to seal the lower-pressure chamber 30 from the atmosphere. The end wall 6 has a first port 9 which communicates with the chamber 30 and is connectable to a source of a first (low-pressure) fluid by flexible conduit means 31 (FIG. 3), and a second port 11 which also communicates with the chamber 30 and is connected to a collecting vessel 11b for fluid which is to be evacuated from the chamber 30. The flexible conduit 11a which connects the vessel 11b with the port 11 contains a shutoff valve 13.

The upper end of the cylinder 1 receives a flange 7 constituting the ring-shaped lower end portion of an elongated tubular casing 7a. The flange 7 is surrounded by an O-ring 5 which seals the high-pressure chamber 28 from the surrounding atmosphere. The upper end of the casing 7a is sealed by an end wall 8 having a first port 10 which is connected to a source of high-pressure fluid by flexible conduit means 29 and a second port 12 which is connected with a collecting vessel 12b for such fluid. The flexible conduit 12a which connects the port 12 with the vessel 12b contains a shutoff valve 14.

The peripheral surface of the piston 2 has a ring-shaped index or marker 15 which is movable with reference to a fixedly mounted scale 24 (see FIGS. 2 and 3). The casing 7a confines novel biasing means 16 which comprises a relatively weak helical tension spring 17 in series with a relatively strong helical tension spring 18. The upper end face of the piston 2 has a relatively short connecting element or plug 21 with external threads having the same lead as the lowermost convolutions of the stronger tension spring 18. Such lowermost convolutions surround the plug 21, i.e., the piston 2 is suspended on the spring 18 by means of the plug 21 and is normally biased upwardly, i.e., in a direction to increase the volume of the low-pressure chamber 30. The uppermost convolutions of the weaker tension spring 17 surround a relatively short threaded connecting element or plug 19 which is secured to or made integral with the underside of the end wall 8, and the lowermost convolutions of the tension spring 17 surround the threads on the upper portion of an intermediate connecting element or plug 20 which is slidably guided by an elongated rod 22 having a stop 23 at the lower end thereof. The rod 22 is secured to or made integral with the end wall 8 and/or plug 19 and extends downwardly toward but short of the flange 7 at the lower end of the casing 7a. The tension spring 17 expands when the pressure of fluid in the chamber 28 rises and/or the pressure of fluid in the chamber 30 decreases so that the fluid moves the piston 2 downwardly. Such expansion of the spring 17 does not substantially entail an expansion of the stronger spring 18; the latter merely pushes the piston 2 toward the end wall 6 at the lower end of the cylinder 1. When the intermediate plug 20 reaches and is arrested by the stop 23, the stronger tension spring 18 begins to expand in response to further rise of fluid pressure in the chamber 28 whereby the bias of the spring 17 remains unchanged. Thus, the tension spring 17 opposes the movement of piston 2 toward the end wall 6 during a first stage, and the tension spring 18 opposes the movement of piston 2 during the next-following second stage of such movement of the piston relative to the cylinder 1. The stop 23 at the lower end of the guide rod 22 prevents excessive stressing of the weaker spring 17. It is not necessary to subject the springs 17, 18 to initial stressing; this insures that the piston 2 can react to minute differences between the pressures of fluids in the chambers 28 and 30. When the pressure differential reaches a certain value, the piston 2 moves into abutment with the end wall 6 at the lower end of the cylinder 1 so that any further rise of fluid pressure in the chamber 28 cannot result in excessive stressing of the tension spring 18. The biasing means including the tension spring 17, 18 is calibrated by resorting to certified weights.

The scale 24 is mounted on the housing or support 3 and its graduated surface is located in a plane which includes the common axis of the cylinder 1 and piston 2 (see the arrow 26 in FIG. 2). Since the material of the cylinder 1 transmits light, the movements of marker 15 on the piston 2 relative to the scale 24 can be readily seen by looking at the front side of the pressure gage, i.e., upwardly, as seen in FIG. 2. The graduations 25 of the scale 24 are preferably grooves having a depth of approximately 0.5 millimeter and a length of up to 25 millimeters. This insures that the readings are free of parallax errors. It is preferred to provide the scale 24 with two sets of graduations 25, namely a (first) set of closely adjacent graduations along which the marker 15 moves during expansion of the weaker tension spring 17 and a (second) set of graduations located at a greater distance from each other and serving to furnish indications while the piston 2 expands the stronger tension spring 18. Since the pressure gage is normally mounted in upright position, the graduations of the second set are located at a level below the graduations of the first set. The distribution of graduations forming the two sets corresponds to the characteristic of the biasing means 16 as a function of differential pressure.

The housing 3 is mounted on a preferably fixed carrier 27 which allows the cylinder 1 to move through an angle of approximately 180°, i.e., between a first position which is shown in FIG. 1 and a second position in which the end wall 6 is located at a level above the cylinder.

When the operator wishes to reduce the pressure of fluid in the chamber 28, the valve 14 in the conduit 12a is opened whereby the tension springs 16, 17 contract and the piston 2 assumes its upper end position in which it abuts the lower end face of the flange 7. Such contraction can be assisted by fluid in the chamber 30 if the pressure of fluid in the chamber 30 exceeds atmospheric pressure. The lower chamber 30 is vented by opening the valve 13 in the conduit 11a; the piston 2 then moves to the lower end position (of abutment with the end wall 6) as long as the pressure of fluid in the chamber 28 exceeds atmospheric pressure. If the pressure in the chamber 28 also equals atmospheric pressure, complete evacuation of the chamber 30 can be achieved by turning the pressure gage upside down, i.e., by rotating the housing 3 through 180° with reference to the carrier 27. This enables air to leave the chamber 30 by rising toward and by flowing through the port 11.

An important advantage of a piston whose material has a heat expansion coefficeint which closely approximates or equals the heat expansion coefficient of the material of the cylinder is that the piston can be mounted in the cylinder with minimal clearance and that such clearance remains unchanged irrespective of changes in the temperature of surrounding air, fluid in the chamber 28 and/or fluid in the chamber 30. This is in contrast to conventional pressure gages wherein the cylinder consists of glass but the piston consists of steel or another metallic material. It has been found that friction between the periphery of the piston 2 and the internal surface of the cylinder 1 remains unchanged under all foreseeable operating conditions and that the leakage (if any) of fluid from the chamber 28 into the chamber 30 or vice versa does not increase in response to heating or cooling of the gage.

The improved biasing means 16 exhibits the advantage that, when the helical tension springs 17 and 18 are subjected to progressively increasing stresses during the respective stages of movement of the piston 2 in a direction to increase the volume of the chamber 28, these springs cannot buckle as in conventional spring-loaded gages wherein the piston is biased by a compression spring. Lateral buckling of springs in response to increasing stresses results in frictional engagement of certain convolutions with the adjacent stationary surfaces of the gage whereby the friction contributes to errors in determination of pressure differential between the two chambers. Furthermore, the relatively weak spring 17 is expanded during a relatively long portion of movement of the piston 2 from the one to the other end position whereby the marker 15 cooperates with the scale 24 to furnish accurate readings in response to extremely small changes of fluid pressure in the chamber 28 and/or 30. Thus, the relatively weak spring 17 contributes to sensitivity of the gage during that stage of operation when the difference between the pressures of fluids in the chambers 28 and 30 is extremely small. Moreover, the accuracy of measurements during expansion or contraction of the weaker spring 17 is not affected by the fact that the spring 18 is much stronger because the length of the spring 18 does not change while the connecting element 20 moves along the guide rod 22, i.e., while the weaker spring 17 expands or contracts. The stronger spring 18 becomes operative only when the spring 17 has been expanded to a maximum permissible degree, and this stronger spring then enables the gage to furnish highly accurate readings which are indicative of more pronounced differences between the pressures of fluids in the chambers 28 and 30.

Still another advantageous feature of the improved gage is that the connecting element 21 serves as a means for suspending the piston 2 on the spring 18 of the biasing means 16. This enables the gage to measure extremely small differences between the pressures of fluids in the chambers 28 and 30 because such differences need not be used to compensate for the weight of the piston, i.e., the weight of the piston does not influence the readings when the difference between the pressures of the two fluids is extremely small.

As mentioned above, the length of graduations 25 in the front side of the scale 24 is sufficient to avoid parallax errors. As a rule, the length of graduations 25 will exceed 20 millimeters (it is preferably about 25 millimeters) and the depth of graduations (if such graduations constitute grooves) is in the range of several (e.g., five) tenths of 1 millimeter. The improved scale 24 enables the operator to obtain readings which are much more accurate than in pressure gages wherein the scale is applied directly to the cylinder or wherein the piston serves as a means for transmitting motion to a mechanism which moves a pointer along a stationary scale or vice versa.

The provision of port 12, conduits means 12a and valve 14 is desirable but optional. The provision of port 11, conduit means 11a and valve 13 is also optional but even more desirable than the provision of parts 12, 12a and 14. Thus, when the shutoff valve 13 is opened and the piston 2 moves toward and into abutment with the end wall 6 of the cylinder 1, it expels air bubbles (if any) from the low-pressure chamber 30. The advantages of expulsion of air bubbles will be readily appreciated since the bubbles are likely to change their volume at different static pressures and/or temperatures with attendant errors in readings furnished by the marker 15 and scale 24. Moreover, the bubbles tend to rise to the underside of the piston 2 so that they can adversely influence the readings even if the piston repeatedly moves close but not all the way to its lower end position. Also, the bubbles tend to change the buoyancy of the piston 2 in the interior of the cylinder 1.

FIG. 3 shows an apparatus 32 which utilizes the pressure gage of FIGS. 1 and 2 and serves to test the condition of various filter elements and water separating elements in a system for admission of fuel to the tanks of aircraft. The apparatus 32 has a receptacle 132 with an inlet 33 for fuel, an outlet 35 through which fuel flows toward the tank of an aircraft, and a channel 34 between the inlet 33 and outlet 35. Three filter (coalescer) elements a, b and c are mounted in parallel between the inlet 33 and channel 34 in such a way that fuel entering the receptacle 132 via inlet 33 can flow into the channel 34 only by passing through the filters a to c. Fuel which fills the channel 34 can flow into the outlet 35 by way of three water separating elements d, e and f which are connected in parallel with each other. Suitable probes are mounted in the inlet 33 (see the probe 36a), at the intake ends of the filter elements a, b, c (see the probes 36b, 36c, 36d), in the channel 34 (see the probes 36e, 36f), at the discharge ends of water separating elements d, e, f (see the probes 36g, 36h, 36i) and in the outlet 35 (see the probe 36k). Each probe is a tubular conduit which is connected with one or more valves 37, 38, and these valves can be actuated by knobs or analogous actuating elements A, B, C, a', b', c',d', e', f' which are mounted in or on a control panel 39. The aforementioned flexible conduits 29 and 31 are respectively connectable with selected valves 37, 38 in response to acutation of corresponding knobs on the control panel 39.

When the operator wishes to determine the difference between fuel pressures in the inlet 33 and channel 34 of the receptacle 132, the two knobs marked A are actuated to open the respective valves 37, 38 whereby the probe 36a admits fuel into the upper chamber 28 (via conduit means 29) and the probe 36e admits fuel into the chamber 30 (via conduit means 31). The marker 15 then registers with a certain graduation of the scale 24, and the operator can determine whether or not the pressure differential between the inlet 33 and channel 34 is acceptable.

If the operator wishes to determine the pressure difference between the channel 34 and outlet 35, the knobs B are actuated to open the associated valves 37 and 38 whereby the probe 36e admits fuel to the chamber 28 and the probe 36k admits fuel to the chamber 30. In order to determine the pressure difference between the inlet 33 and outlet 35, the operator actuates the knobs C to open the respective valves 37, 38 whereby the probe 36a admits fuel to the chamber 28 and the probe 36k admits fuel to the chamber 30.

If the operator wishes to test the integrity of filter elements a, b, c, the knobs a', b', c' are respectively actuated to open the associated valves 37 and 38; the probe 36b, 36c or 36d then admits fuel to the chamber 28 and the probe 36e admits fuel to the chamber 30. Finally, if the operator wishes to test the integrity of water separating elements d, e, f, the knob d', e' or f' is actuated to open the associated valves 37 and 38 whereby the probe 36f admits fuel to the chamber 28 and the probe 36g, 36h or 36i admits fuel to the chamber 30.

By way of example, the improved pressure gage can be designed for an internal pressure of 16 atmospheres and may comprise a glass cylinder (consisting of Duran 50, trademark) with an inside diameter of 14 millimeters and a wall thickness of 4.5 millimeters. The outer diameter of the weaker tension spring 17 is 14 millimeters and the distance which the piston 2 must cover, by moving from its upper end position, in order to cause the plug 22 to engage the stop 23 is 60 millimeters whereby the stress upon the spring 17 equals 0.6032 kp. The outer diameter of the stronger tension spring 18 is also 14 millimeters and the maximum distance which the piston 2 can cover during expansion of the spring 18 is 70 millimeters; the stress upon the spring 18 then equals 3,016 kp. The distance between neighboring graduations 25 of the scale in the upper region of the scale (along which the marker 15 moves during expansion of the weaker spring 17) is 3 millimeters. Each movement of the marker 15 on the piston 2 between two neighboring graduations 25 in the upper portion of the scale 24 corresponds to a pressure change of 0.01 atmosphere.

The deviations of measurements which are furnished by the improved gage from actual differences between the pressures of fluids in the chambers 28 and 30 (at a temperature of 20° C.) do not exceed ±0.05 percent. Thus, if the actual pressure difference equals one atmosphere, the positive or negative deviation of measurement from such actual difference is in the range of 0.0005 atmosphere. Therefore, the improved gage can be used with considerable advantage for measurement of pressure differences in systems which are as important for the safety of persons as the apparatus 32 of FIG. 3. Thus, the person in charge can readily determine the condition of any one of the elements $a$ to $f$ (or the condition of a group of two or more elements) with minimal losses in time and with a degree of accuracy and reproducibility which cannot be matched by presently known testing equipment. This evidently contributes to predictability of the quality of fuel which enters the tanks of an aircraft and hence to the safety of airplanes. For exaple, the operator can determine whether or not surges in fuel pressure entering the inlet 33 of the receptacle 132 have caused one or more elements $a$ to $f$ to burst or to undergo other damage which affects their operation in the apparatus 32. A defective or destroyed element is replaced immediately upon detection so that fuel which flows into the tanks is highly unlikely to contain excessive quantities of water, solids and/or other impurities or contaminants.

The knobs A to C and $a'$ to $f'$ on or in the control panel 39 can be actuated automatically by a suitable program device in a given sequence and at predetermined intervals to insure that each and every part of the apparatus 32 which is likely to be damaged or destroyed is checked at a frequency and with a degree of accuracy which satisfies even the most stringent requirements of authorities in charge of safety of private, unscheduled, scheduled or military aircraft. It is preferred to connect the various probes and valves 37, 38 of FIG. 3 by conduits (shown at 40) of identical or at least approximately equal length.

Of course, the knobs on the control panel 39 of FIG. 3 can be actuated selectively, for example, if an attendant feels that a particular element or group of elements should be tested out of turn.

Even though the improved pressure gage is especially suited for use in apparatus (32) for the testing of filter elements and water separating elements in a system for admission of fuel to aircraft or the like, the gage can be used with equal advantage for many other purposes, i.e., whenever the difference between the pressures of two fluids must be monitored and indicated with a high degree of accuracy and reproducibility.

The biasing means may include three or more series-connected tension springs.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. A differential pressure gage, comprising a hollow cylinder; a piston reciprocably received in and dividing the interior of said cylinder into a low-pressure and a high-pressure chamber, said piston and said cylinder consisting of materials having at least substantially identical heat expansion coefficients; and means for biasing said piston in a direction to reduce the volume of one of said chambers, comprising a plurality of tension springs arranged in series and including a relatively weak first spring which is subjected to progressively increasing stresses only during a first stage of movement of said piston counter to said direction and a relatively strong second spring which is subjected to progressively increasing stresses substantially only during a next-following second stage of movement of said piston counter to said direction.

2. A pressure gage as defined in claim 1, wherein the material of said cylinder transmits light.

3. A pressure gage as defined in claim 1, wherein said piston and said cylinder consist of glass.

4. A pressure gage as defined in claim 1, wherein said springs are helical tension springs which expand during the respective stages of movement of said piston counter to said direction, and further comprising stop means for terminating the expansion of said first spring when said piston completes said first stage of movement counter to said direction.

5. A pressure gage as defined in claim 4, wherein said one chamber is said high-pressure chamber, and further comprising means for admitting differently pressurized fluids into said chambers.

6. A pressure gage as defined in claim 1, wherein said one chamber is normally located at a level above the other of said chambers, and further comprising means for suspending said piston on one of said springs.

7. A pressure gage as defined in claim 1, wherein said springs are helical tension springs each having a first end and a second end, and further comprising stationary first connecting means secured to the first end of said first spring, second connecting means securing the second end of said second spring to said piston, and third connecting means secured to the first end of said second spring and to the second end of said first spring.

8. A pressure gage as defined in claim 7, wherein each of said connecting means comprises an externally threaded plug.

9. A pressure gage as defined in claim 7, wherein said third connecting means moves away from said first connecting means during said first stage of movement of said piston, and further comprising stationary stop means located in the path of movement of said third connecting means to arrest the latter when the piston completes said first stage of movement counter to said direction.

10. A pressure gage as defined in claim 1, wherein the material of said cylinder transmits light, and further comprising scale means outwardly adjacent to said cylinder and located in a plane which includes the axis of said cylinder.

11. A pressure gage as defined in claim 10, wherein said scale means has graduations extending radially of said cylinder and having a length sufficient to prevent parallax errors in reading the position of said piston relative to said scale means.

12. A pressure gage as defined in claim 11, wherein said graduations are grooves having a depth in the range of several tenths of one millimeter.

13. A pressure gage as defined in claim 11, wherein the length of said graduations exceeds 20 millimeters.

14. A pressure gage as defined in claim 1, further comprising conduit means for evacuation of fluid from at least one of said chambers and shutoff valve means in said conduit means.

15. A pressure gage as defined in claim 14, wherein said last mentioned chamber is said low-pressure chamber.

16. A pressure gage as defined in claim 1, further comprising carrier means and means for mounting said cylinder on said carrier means for movement between a first position in which said high-pressure chamber is located at a level above said low-pressure chamber and a second position in which said low-pressure chamber is located above said high-pressure chamber.

17. A pressure gage as defined in claim 16, wherein said mounting means comprises a housing which is rotatable on said carrier means about a substantially horizontal axis and through an angle of substantially 180°.

18. In a testing apparatus, particularly in an apparatus for testing filtering and analogous elements for separation for foreign matter from fluids, the combination of a differential pressure gage including a hollow light-transmitting cylinder, a piston reciprocably received in and dividing the interior of said cylinder into a high-pressure and a low-pressure chamber, said piston and said cylinder consisting of materials having at least substantially identical heat expansion coefficients, and means for biasing said piston in a direction to reduce the volume of said high-pressure chamber, comprising a relatively weak first helical tension spring which expands only during a first stage of movement of said piston counter to said direction and a relatively strong second tension spring which expands only during the next-following stage of movement of said piston counter to said direction; and means for selectively admitting fluids at different pressures into each of said chambers whereby the position of the piston relative to said cylinder is indicative of the differential of fluid pressures in said chambers.

19. The combination of claim 18, further comprising a plurality of elements for separation of water and/or other substances from liquids other than water, especially fuel, each of said elements having an intake end and a discharge end and said admitting means comprising probes arranged to admit into said chambers liquid from the regions of intake and discharge ends of selected elements or groups of elements.

20. The combination of claim 19, wherein said admitting means further comprises conduits connecting said chambers with said probes, normally closed valves in said conduits, and actuating means operable to open selected ones of said valves.

* * * * *